United States Patent [19]

Wang

[11] Patent Number: 4,666,727
[45] Date of Patent: May 19, 1987

[54] WOK COOKING ADAPTED FOR ORIENTAL AND WESTERN MODES

[76] Inventor: Gung H. Wang, 8200 S. Indiana, Chicago, Ill. 60643

[21] Appl. No.: 813,470

[22] Filed: Dec. 26, 1985

[51] Int. Cl.⁴ .......................... A23L 1/01; A47J 37/10
[52] U.S. Cl. ...................................... 426/523; 99/422; 99/425; 126/390; D7/354
[58] Field of Search .................. 426/523; 99/422, 425, 99/444; 126/390; D7/354

[56] References Cited

U.S. PATENT DOCUMENTS 3,079,855  3/1963  Valis ...................................... 99/425
4,574,777  3/1986  Bohl et al. .............................. 99/425

Primary Examiner—George Yeung

[57] ABSTRACT

A method of wok cooking in a utensil having a generally flat bottom cooking area and a generally upwardly facing food retaining shoulder which is elevated alongside the cooking area and extends toward an upwardly extending wall, comprises cooking the food on the cooking area and shifting cooked food from the cooking area onto the shoulder means on which the food is drained of cooking oil and kept warm. Also disclosed is an improved multi-hump shoulder structure with oil drainage channels.

20 Claims, 6 Drawing Figures

U.S. Patent   May 19, 1987   4,666,727
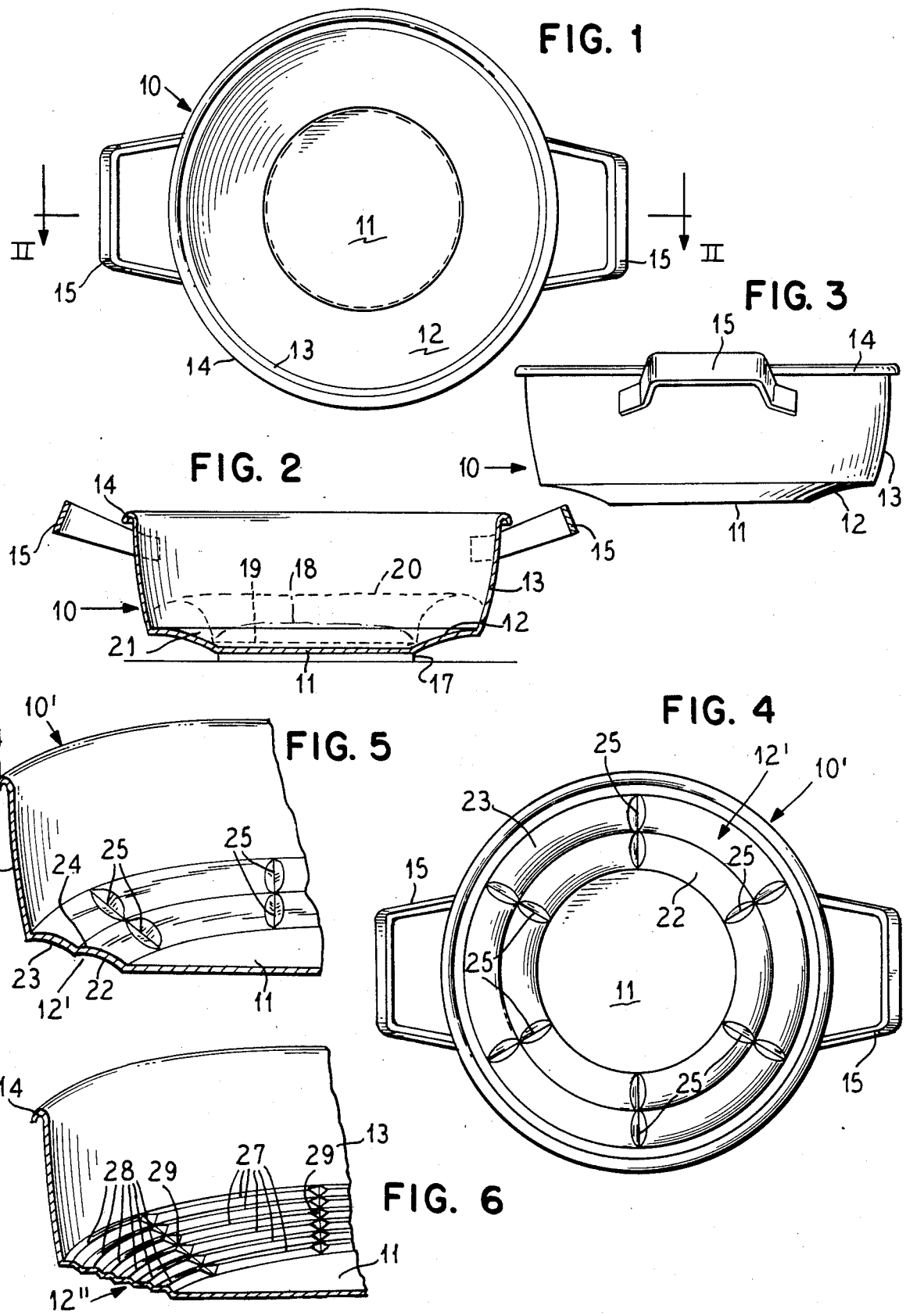

WOK COOKING ADAPTED FOR ORIENTAL AND WESTERN MODES

BACKGROUND OF THE INVENTION

This invention relates to the art of cooking and is especially concerned with wok cooking adapted for both oriental and western modes of woking.

Cooking with a conventional wok has numerous advantages, as are well known, especially for stir frying, braising, and the like. However, the conventional wok has a rounded bottom, which makes it difficult to use the wok on a flat gas range burner grid or an electric range heating unit, or on a charcoal grill, and the like, which are conventionally flat for supporting conventional western mode flat-bottomed cooking utensils.

SUMMARY OF THE PRESENT INVENTION

A principal object of the present invention is to provide for new and improved wok cooking adapted for both oriental and western modes of cooking.

Another object of the invention is to provide a new and improved cooking method utilizing a modified wok utensil.

A further object of the invention is to provide for stir frying, braising, or the like, utilizing less oil than in conventional wok cooking, but attaining results equal to conventional wok cooking, and further improving the cooking results by draining oil from the cooked food while maintaining the cooked food at a desirable temperature.

In accordance with the principles of the present invention, there is provided a method of wok cooking in a utensil having a generally flat bottom cooking area and a generally upwardly facing food retaining shoulder means which is elevated alongside the cooking area and extends toward an upwardly extending wall, and comprising cooking food on the cooking area, and shifting cooked food from the cooking area onto the shoulder means.

For practicing this method, a new design of wok as disclosed in my copending design patent application, Ser. No. 731,774 filed May 8, 1985 may be used. Certain improvements in the utensil of that application are disclosed in the present application.

BRIEF DESCRIPTION OF THE DRAWINGS

Other objects, features and advantages of the present invention will be readily apparent from the following description of representative embodiments thereof, taken in conjunction with the accompanying drawing, although variations and modifications may be effected without departing from the spirit and scope of the novel concepts embodied in the disclosure and in which:

FIG. 1 is a top plan view of a utensil for practicing the cooking method of the present invention.

FIG. 2 is a sectional detail view taken substantially along the line II in FIG. 1.

FIG. 3 is a side elevational view of the utensil of FIG. 1.

FIG. 4 is a top plan view of a modification of the utensil.

FIG. 5 is a segmental fragmentary elevational view looking toward the side wall in the utensil of FIG. 4;

FIG. 6 is a view similar to FIG. 5 but showing a further modification.

DETAILED DESCRIPTION

A utensil 10 as shown in FIGS. 1, 2, and 3, is essentially the same as one of the forms of utensils shown in my copending design patent application, and is adapted for practicing the method of wok cooking adapted for both oriental and western modes of cooking to which the present invention is particularly directed. For this purpose, the utensil 10 has a generally flat bottom area 11 and a generally upwardly facing food retaining shoulder means 12 alongside the bottom cooking area 11 and which extends toward an upwardly extending wall 13 high enough to avoid splattering and reinforced by means of a turned finishing and reinforcing upper edge bead 14. One or more suitable handles 15 may be mounted on the upper outside portion of the wall 13. In the prefered construction shown, the utensil 10 may be a spun metal structure in which the bottom wall area 11 is circular and of a diameter to rest in stable heat exchange relation upon a heating surface 17 which may be of any preferred type such as a gas burner grill, electric stove heating element, and the like. It will also be appreciated that the generally flat bottom area 11 is well adapted to be supported on a charcoal or like grill.

The shoulder 12 comprises an upwardly and radially outwardly slanting upwardly humped, cross sectionally curvate annular concentric structure continuously about the bottom area 11 and serves a dual function. It serves not only as a food retaining shoulder, but also as a food warmer/slow cooking area.

In cooking with the utensil 10, the food to be cooked, generally identified schematically at 18, is placed upon the flat bottom cooking area 11 which is in heat transfer relation to the heat source 17. Cooking oil 19 may be received on the cooking area 11. Stir frying or braising of the food 18 is then effected until the food 18 is deemed adequately cooked, and the food then being shifted as indicated at 20 onto the shoulder 12 selectively to any point about the circular area of the shoulder, which provides a convenient ramp up which the food can be slid. The pitch of the shoulder is at an angle of repose which substantially retains the food 20 against slipping back toward the cooking area 11. However, such pitch is ample to permit oil to drain, as indicated by the arrow 21, back into what is in effect a well or sump defined on the cooking area 11 within the confines of the surrounding shoulder 12. Further, the generally concave elevated undersurface of the shoulder 12 receives heat escaping from the heat source 17 and thereby provides a warming surface for the food 20 thereon.

It will be apparent that the method of wok cooking enabled by the utensil 10 has numerous advantages. The food 18 can be cooked with a minimum of oil 19 because the flat cooking area 11 permits the oil 19 to distribute over the area in a shallow depth, in contrast to a concave bottom wok where the oil tends to collect in the center and therefore a relatively larger volume of oil must be used in order to assure that adequate oil will be present for the food being cooked over the entire concave cooking area.

In a conventional concave wok, the food normally tends to return toward the lowest portion of the wok cooking area. In contrast, the food 20 supported on the shoulder 12 is retained on the shoulder and the oil advantageously drains back toward the cooking area 11. The warming facility of the shoulder 12 not only enhances oil drainage by maintaining the oil liquidity, but also maintains the food 20 warm, without any further substantial cooking effect provided the heat source 17 is properly regulated, or additional slow cooking may be effected.

The food 20 can remain on the shoulder 12 as long as desired while additional food 18 is being cooked. Continuous cooking is facilitated because cooked food is shifted from the cooking area 11 onto the retaining shoulder 12 from which the food can be served as desired without interrupting the cooking.

If there is a period of interruption in the cooking of additional food, the already cooked food 20 can be held for an extended interval on the shoulder 12 warm and ready to serve, without necessity of removing the utensil 10 from the heat source 17 which in such an interval may be regulated to reduced heat just sufficient for warming purposes. At this time a lid may be placed over the top of the utensil 10 to avoid drying out of the food 20.

In the modification of FIGS. 4 and 5, the cooking utensil 10' may, in essential respects be substantially the same as the cooking utensil 10 and identity of structure is indicated by the same reference characters as in FIG. 1. In the utensil 10', however, the retaining shoulder 12' is provided with means for improved cooked food retention and oil drainage comprising a plurality of annular humps including an inner annular hump 22 concentric with the bottom cooking area 11, and an outer annular hump 23 concentric with the inner hump 22 and joining the wall 13. At juncture of the humps 22 and 23, there is an annular ledge 24 which further facilitates retention of food on the shoulder 12'. An annular series of radially extending oil drainage grooves 25 extend across the shoulder humps 22 and 23 and drain oil from food retained on the shoulder 12' to the sump or well defined over the cooking surface 11. The concave cross section undersides of the humps 22 and 23 facilitate warming heat transfer to the food on the shoulder 12'.

In another modification of food retaining shoulder 12" as seen in FIG. 6, the shoulder has a large number, herein shown as six relatively narrow humps 27 of progressively greater diameter from the cooking surface 11 to the wall 13 in a generally stepwise fashion. There may, of course, be a greater or lesser number of the annular generally rib-like humps 27, if desired. The plurality of hump ribs 27 provides upward projection means or food retaining formations affording additional assurance of food retention. Warming heat retention is improved by virtue of the annular grooves or channels on the undersides of the hump ribs. At the upper side of each of the hump ribs 27, there is a ledge 28 which affords fairly positive cooked food retention, especially where relatively finely chopped or otherwise discrete food is being cooked and retained on the shoulder 12" for oil drainage and warming. Oil drainage is assured by means of radially extending drainage channels 29 extending across the rib humps 27 and leading out at the cooking area 11.

It will be understood that variations and modifications may be effected without departing from the spirit and scope of the novel concepts of the present invention.

I claim as my invention:

1. A method of wok cooking in a utensil having a generally flat bottom heat transfer central circular cooking area and a generally upwardly facing food annular heat transfer food retaining shoulder means which is elevated alongside said cooking area and extends in 360° surrounding relation about said circular area toward a upwardly extending surrounding wall, and comprising:
   cooking food on said cooking area;
   shifting cooked food from any point on said cooking area onto said shoulder means;
   and selectively retaining the food on said shoulder means.

2. A method according to claim 1, wherein said annular shoulder means is pitched toward said circular cooking area and which comprises cooking the food in cooking oil on said cooking area, and draining back to said cooking area oil from the food on said shoulder means.

3. A method according to claim 1, wherein said shoulder means has an underside concave cross-section surface, and which comprises heating said shoulder means by heat directed to said underside surface and transferring the heat as warming heat to said food on said shoulder means.

4. A method according to claim 1, which comprises cooking the food in oil on said area, draining oil from the food supported on said shoulder means back to said cooking area, and effecting heat transference uniformly throughout the entire annulus of said shoulder means through said shoulder means and thereby warming the food on said shoulder means.

5. A method according to claim 1, wherein said shoulder means comprises an annular concentric hump about said cooking area, shifting the cooked food from said cooking area substantially uniformly onto said hump and heating the underside of said hump and thereby transferring heat through said hump to the food on the hump.

6. A method according to claim 5, which comprises in part retaining said cooked food by means of upward projection means on said hump.

7. A method according to claim 1, which comprises shifting the cooked food by sliding it from said cooking area onto said shoulder means serving as a ramp leading from said cooking area.

8. A method according to claim 1, which comprises retaining said food on said shoulder means by supporting said food on a progressive series of annular humps on said shoulder means.

9. A method according to claim 8, comprising cooking the food in oil on said cooking area, and draining the oil from said shoulder means by way of drainage grooves leading to said cooking area.

10. A method of wok cooking in a utensil having a generally flat circular bottom cooking area and a generally upwardly facing food retaining annular shoulder means uniformly entirely surrounding said cooking area and sloping from an upwardly extending wall toward the cooking area, comprising:
   placing said cooking area upon a heat source;
   placing oil on said cooking area;
   placing food in the oil on said cooking area and cooking the food by means of heat provided by said heat source in heat transfer relation through said cooking area;
   shifting cooked food from said cooking area onto said shoulder means serving as a ramp for this purpose;
   draining oil from the food on the shoulder means back to the cooking area; and
   heating a cross-sectionally concave underside surface of said shoulder means and thereby transferring heat through said shoulder means for warming the food thereon by means of heat escaping from said heat source past said cooking area onto said concave surface.

11. A method according to claim 10, comprising retaining said food on said shoulder means by engaging the food on a progressive series of annular food retaining formations on said shoulder means, and draining the oil from said shoulder means past said formations.

12. A wok cooking utensil having a generally flat bottom cooking area and a generally upwardly facing food retaining shoulder means which is elevated alongside said cooking area and extends toward an upwardly extending wall, comprising:
said shoulder means sloping from said wall toward said cooking area; and
a plurality of upwardly projected food retaining formations on said shoulder means for retaining food on the shoulder means against sliding back toward said cooking area.

13. A utensil according to claim 12, wherein said shoulder means is continuously annular about said cooking area, and said food retaining formations comprise a plurality of annular humps.

14. A utensil according to claim 13, wherein said annular humps are at least two in number, and radial oil drainage channel means extending across said annular humps and leading to said cooking area.

15. A utensil according to claim 14, including ledge means between said annular humps.

16. A utensil according to claim 12, wherein said cooking area is circular, said shoulder means comprising a plurality of annular humps providing a surface sloping toward said cooking area, annular ledge means between said humps, and means for draining oil from said humps and said ledge back to said cooking area.

17. A utensil according to claim 12, wherein said cooking area is circular, said shoulder means comprising a stepped plurality of humps providing food retaining ledges, and means for draining oil from said ledges.

18. A utensil according to claim 17, wherein said means for draining comprises a plurality of circumferentially spaced generally radially extending oil drainage channels extending across said stepped humps.

19. A method of wok cooking in a utensil having a generally flat bottom cooking area and a generally upwardly facing food retaining shoulder means which is elevated alongside said cooking area and extends toward an upwardly extending wall, and comprising:
cooking food on said cooking area;
shifting cooked food from said cooking area onto said shoulder means;
and retaining said food on said shoulder means by supporting said food on a progessive series of annular humps on said shoulder means.

20. A method according to claim 19, comprising cooking the food in oil on said cooking area, and draining the oil from said shoulder means by way of drainage grooves leading to said cooking area.

* * * * *